March 31, 1970 R. R. LECHEVALIER 3,503,688
MULTIPLE AXIS LASER ANGULAR RATE SENSOR
Filed Aug. 15, 1966
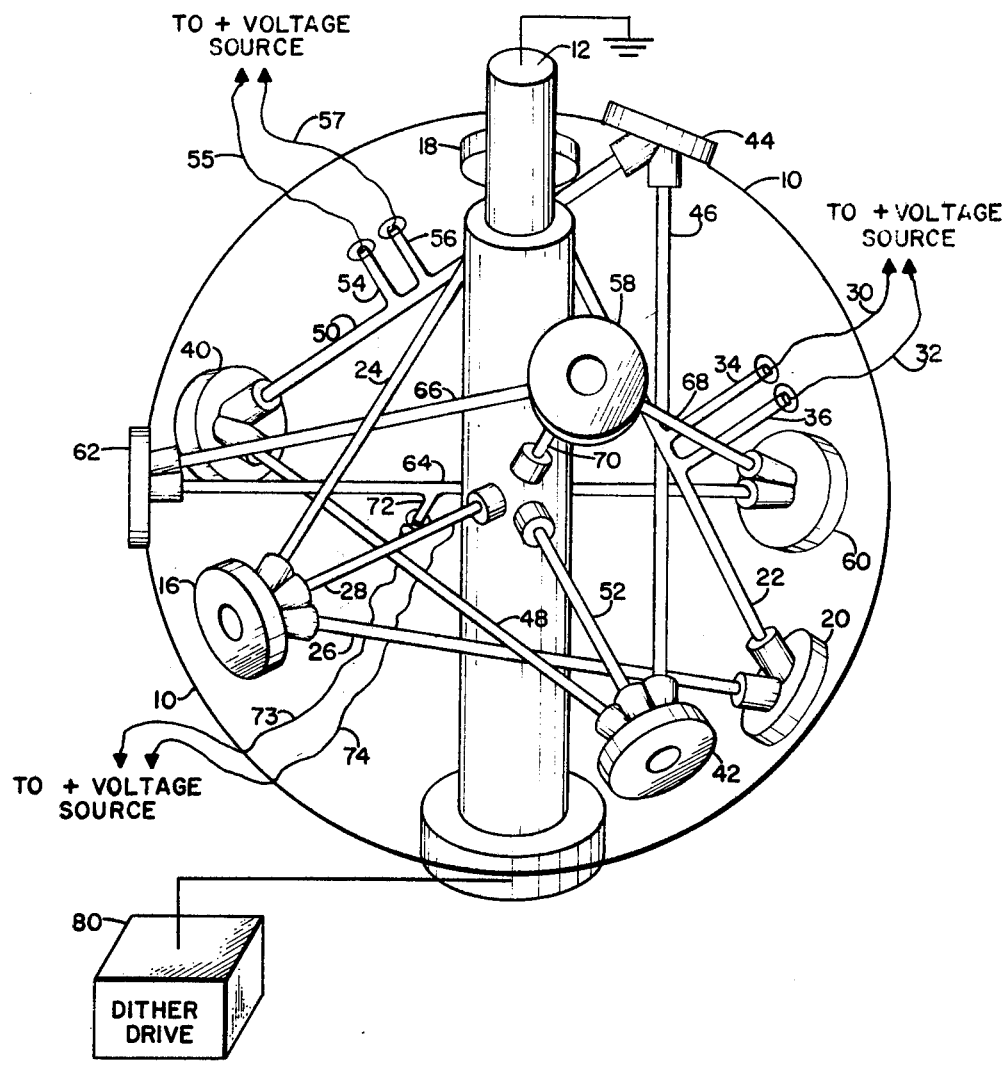
INVENTOR.
ROBERT R. LECHEVALIER
BY *Charles J. Ungemach*
ATTORNEY

United States Patent Office 3,503,688
Patented Mar. 31, 1970

3,503,688
MULTIPLE AXIS LASER ANGULAR RATE SENSOR
Robert R. Lechevalier, White Bear Lake, Minn., assignor to Honeywell Inc., Minneapolis, Minn., a corporation of Delaware
Filed Aug. 15, 1966, Ser. No. 572,486
Int. Cl. G01b 9/02
U.S. Cl. 356—106                                    10 Claims

ABSTRACT OF THE DISCLOSURE

A rugged and inexpensive structure for use in multiple axis laser angular rate sensors, in which a plurality of endless multi-sided light passages having intersecting effective planes are formed in a spherical block of quartz, the passages being completed by mirrors secured to the block at the ends of the passages to reflect light from one passage into another: angular oscillation communicated to the block simultaneously "dithers" the several passages to prevent "lock-in."

---

The present invention relates to laser angular rate sensors and more particularly to an advanced and improved version of the rate sensor shown in copending application Ser. No. 435,969, now Patent No. 3,390,606, in the name of Theodore J. Podgorski, also assigned to the present assignee.

Briefly, my invention comprises a solid block support apparatus to support three sets of counter rotating laser beams whose frequencies may be monitored in order to determine the rate and direction of rotation of the support apparatus. The theory of operation of this type of device is clearly discussed in the above referenced copending application. The reasons for using a solid block construction for this type of device are also discussed in the above referenced copending application. The present invention lies in extending these techniques to a three axis angular rate sensor.

In the instant invention, a spherical quartz block has numerous holes drilled in it so as to form three triangular paths in which the laser beams may travel. The corners of all the triangles are positioned near the surface so that mirrors may be attached to the face of the quartz block to reflect light from one leg of the triangle into the next leg. In addition, various other cavities are machined into the quartz block so as to provide locations to insert anodes and cathodes for the purpose of exciting the gas.

It is an object of my invention, therefore, to provide a new and improved three axis laser angular rate sensor which may be ruggedly and inexpensively constructed. Further objects and advantages will become apparent and a complete understanding of the invention will be had by reference to the above mentioned copending application and the following description and drawing in which the preferred embodiment of my invention is schematically illustrated.

In the figure, a mechanically and thermally stable spherical block 10 is shown. Block 10 may be constructed of quartz or any other material which is relatively insensitive to mechanical and thermal stresses. Block 10 surrounds a metal shaft 12 which projects through and seals a cylindrical hole in the center of block 10. Shaft 12 also serves as an electrode for energizing the lasing gas as will be described hereinafter.

Numerous tunnels or holes are formed in block 10 in order to contain the lasing gas and to provide paths in which the laser beam may oscillate. The tunnels are arranged so as to form three mutually orthogonal triangles which have corners near the surface of spherical block 10. Mirrors are fastened to the surface of spherical block 10 at the corners of the triangles so as to reflect the laser light from one leg of the triangle into the next leg of the triangle. In this way, three laser beams may be maintained about the three triangular paths. One triangular closed loop lasing path is defined by mirrors 16, 18, and 20 and tunnels 22, 24, and 26. Mirrors 16, 18, and 20 are sealed on the block 10 so that the triangular tunnel may be filled with a suitable lasing gas such as a mixture of helium and neon. The gas is caused to lase by means of an electric discharge. For this reason, the triangular chamber must be in communication with suitable electrodes so that electric current may be maintained therethrough. For this purpose, an additional tunnel 28 connects the triangle to the center shaft 12 which shaft is grounded so as to provide one electrode. The other electrode is provided by means of two electrical leads 30 and 32 which are in communication with the triangle by means of two sealed tunnels 34 and 36. Thus, if leads 30 and 32 are connected to suitable high voltage sources two discharge paths will be created. One path will be from lead 30 through tunnel 34, tunnel 22, tunnel 24 and tunnel 28 to the grounded electrode 12. The other discharge path will be from lead 32 through tunnel 36, tunnel 22, tunnel 26 and tunnel 28 to the electrode 12. These two discharges cause the gas in the triangle to lase forming a closed loop laser beam between mirrors 16, 18, and 20. Actually, laser light will be traveling in both directions about the triangle and if block 10 is rotated about an axis perpendicular to the plane of this triangle the two oppositely traveling beams will be of different frequencies as is more clearly explained in the above mentioned copending application. The difference in frequency is proportional to the rate of rotation of block 10 about that axis. This difference in frequency may be measured by techniques and readout mechanisms well known to those skilled in the art. Such readout mechanisms are the subject of the above referenced copending application.

In order to sense rotation about the other two axes, two more triangular tunnels or lasing paths are formed in block 10 which preferably are mutually orthogonal to the first triangular tunnel or lasing path above described. The second triangle is defined by a group of mirrors 40, 42, and 44 and a group of tunnels 46, 48, and 50. This triangle is in communication with the center electrode 12 by means of a tunnel 52 and is also connected to a positive voltage source by means of a pair of anode tunnels 54 and 56 connected respectively to conductors 55 and 57. It has been discovered that a common electrode at the center of block 10 may be used for all of the lasing paths, although, of course, separate electrodes could be employed. In the preferred embodiment, metal shaft or electrode 12 is the cathode for all of the discharge paths while leads such as 30 and 32 are anodes.

The third orthogonal triangular lasing path is defined by a group of mirrors 58, 60, and 62 and a group of tunnels 64, 66, and 68. This third triangular tunnel is connected to the cathode by means of a tunnel 70 and to the anodes by means of a tunnel 72 and a tunnel which is not visible in the drawing because it is behind cathode 12. Tunnel 72 and the hidden tunnel are connected to a pair of conductors 73 and 74 respectively.

Because of the phenomenon known as "lock-in," laser angular rate sensors tend to be difficult to use at very low rotation rates. It is, therefore, desirable to introduce a small dithered input rotational rate so as to minimize the time during which the device is measuring low input rates. "Lock-in" and the technical reasons for dithering are more fully explained in a copending application Ser. No. 445,171, in the name of Joseph E. Killpatrick, also assigned to the present assignee. The present invention is particularly well suited for introducing this type of input dither. All of the three triangles lie in planes which are inclined with respect to the center shaft 12 by an angle. Thus, if shaft 12 and block 10 are vibrated or dithered about the axis of shaft 12 by a suitable mechanical dithering means, 80, components of the dither are presented to each triangular path and all three of the triangles may be simultaneously dithered. It should be noted that it is not essential to the operation of the device that the triangles receive an equal dither component. Nevertheless, in many cases having an equal component of dither in each triangle would be advantageous. This may be achieved in the present invention by placing the center shaft 12 so that each of the triangles is inclined with respect to shaft 12 at the same angle. Dithering means 80 may be the same as shown in the copending application Ser. No. 445,171.

It is at once obvious that many variations may be made to the preferred embodiment shown. For example, it is not necessary that the paths be triangles since any polygonal path may be utilized. In addition, the polygons need not be of the same size or shape nor need they have sides of equal length as is suggested by the drawing. Also the dithering means may comprise many various devices as disclosed by the referenced copending Killpatrick application. Thus, the invention is not intended to be limited to the embodiment shown except as defined by the appended claims.

I claim:
1. In combination:
    a block having three closed loop polygonal tunnels therein, laying in three planes which intersect so as to define three mutually orthogonal lines in space; and
    means at the intersections of said polygonal tunnels oriented to reflect light in a closed loop along the polygonal tunnels of each of the respective closed loops.
2. The apparatus of claim 1 including an electrode in said block, which electrode is in communication with the three paths; and
    three pairs of electrodes, each pair in communication with one of the three paths.
3. The apparatus of claim 1 including means to dither said block about an axis which intersects said three planes.
4. In combination:
    a block having a plurality of endless, multi-sided passages therein, each said passage comprising a plurality of straight tunnels extending through said block between points at the surface thereof which are common to pairs of said tunnels, the common points for the tunnels making up each passage lying effectively in the same plane, and the effective planes of said passages intersecting to define lines which have mutually orthogonal components of direction; and
    reflecting means at each of the common points, oriented so that light impinging thereon from one tunnel of each pair is reflected through the other tunnel to follow a closed path.
5. Apparatus according to claim 4 in which each said path is a regular polygon.
6. Apparatus according to claim 4 in which each said path is a triangle.
7. Apparatus according to claim 4 in which said lines are mutually orthogonal.
8. Apparatus according to claim 4 together with means for causing slight oscillation of said block about an axis which passes through said effective planes at a substantial angle so that said oscillation has a component in each of said planes.
9. Apparatus according to claim 4 together with a single electrode in said block, in communication with said passages, and pairs of further electrodes in communication with said passages respectively at localities remote from the single electrode.
10. Apparatus according to claim 9 including a plurality of further passages each providing comunication between said single electrode and one of said endless passages at one of said common points.

References Cited
UNITED STATES PATENTS
3,390,606   7/1965   Podgorski _____ 331—94.5

RONALD L. WIBERT, Primary Examiner

T. R. MOHR, Assistant Examiner

U.S. Cl. X.R.

331—94.5